US010417539B2

United States Patent
Uemura et al.

(10) Patent No.: US 10,417,539 B2
(45) Date of Patent: Sep. 17, 2019

(54) IMAGE FORMING APPARATUS THAT OUTPUTS CARRIER SIGNALS INTERMITTENTLY USING A TAG READER

(71) Applicant: KYOCERA Document Solutions Inc., Osaka-shi, Osaka (JP)

(72) Inventors: Shizuya Uemura, Osaka (JP); Tadaharu Kusumi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/986,639

(22) Filed: May 22, 2018

(65) Prior Publication Data

US 2018/0341840 A1 Nov. 29, 2018

(30) Foreign Application Priority Data

May 26, 2017 (JP) ................................ 2017-104364

(51) Int. Cl.
G03G 15/00 (2006.01)
G06K 15/00 (2006.01)
H04N 1/00 (2006.01)
G06K 7/10 (2006.01)

(52) U.S. Cl.
CPC ....... *G06K 15/407* (2013.01); *G06K 7/10297* (2013.01); *G06K 15/408* (2013.01); *G06K 15/4075* (2013.01); *H04N 1/00342* (2013.01)

(58) Field of Classification Search
CPC .......... G03G 15/0877; G03G 15/0879; G03G 2215/066; G03G 21/1657; G07G 1/009; G09F 3/0335; G06K 7/10237; G06K 19/07773
See application file for complete search history.

(56) References Cited

U.S. PATENT DOCUMENTS

2011/0274445 A1* 11/2011 Kabai ................ G03G 15/0875
399/12
2017/0060083 A1* 3/2017 Hirayama .......... G03G 21/1652

FOREIGN PATENT DOCUMENTS

JP          2003271021 A    9/2003

* cited by examiner

*Primary Examiner* — Benny Q Tieu
*Assistant Examiner* — Juan M Guillermety
(74) *Attorney, Agent, or Firm* — Alleman Hall Creasman & Tuttle LLP

(57) ABSTRACT

A processor causes a transmission circuit to output a carrier signal intermittently. Each time the carrier signal is output, the processor determines whether or not a level of a detection signal is in a satisfactory state. In a first case where the level of the detection signal is determined to be in the satisfactory state, the processor performs a read control to cause the transmission circuit to perform a precharge process and a transmission process. In a second case where the level of the detection signal is not determined to be in the satisfactory state, the processor determines that the unit attachment portion is in a unit non-attachment state. In the first case, when the processor succeeds in identifying the developer information, the processor determines that the unit attachment portion is in a unit attachment state, and otherwise, determines that the unit attachment portion is in an exceptional state.

6 Claims, 8 Drawing Sheets

IMAGE FORMING APPARATUS THAT OUTPUTS CARRIER SIGNALS INTERMITTENTLY USING A TAG READER

INCORPORATION BY REFERENCE

This application is based upon and claims the benefit of priority from the corresponding Japanese Patent Application No. 2017-104364 filed on May 26, 2017, the entire contents of which are incorporated herein by reference.

BACKGROUND

The present disclosure relates to an image forming apparatus provided with a tag reader configured to read information from a passive-type electronic tag.

In general, an image forming apparatus includes at least one unit attachment portion to which a replenishment unit storing developer can be attached in a detachable manner. An image forming apparatus that can execute a color printing includes four unit attachment portions that respectively correspond to yellow, cyan, magenta, and black developers.

In addition, the image forming apparatus may be provided with a unit detection sensor for detecting whether or not the replenishment unit is attached to the unit attachment portion. When the unit detection sensor detects that the replenishment unit is not attached, the image forming apparatus prohibits the print process and outputs a notification that the replenishment unit is not attached to the unit attachment portion.

Furthermore, the image forming apparatus may be provided with a tag reader. The tag reader reads information from an electronic tag attached to the replenishment unit by performing a short-distance wireless communication. For example, information concerning the developer, such as the color and type of the developer, is recorded in the electronic tag.

There is known a technique in which the unit attachment portion determines that a replenishment unit is not attached to the unit attachment portion when the tag reader cannot communicate with the electronic tag.

SUMMARY

An image forming apparatus according to an aspect of the present disclosure includes at least one unit attachment portion, at least one antenna for short-distance wireless communication, a tag reader, a blocking member, and a displacement mechanism. To the at least one unit attachment portion, a replenishment unit storing developer can be attached in a detachable manner. The at least one antenna for short-distance wireless communication is provided in correspondence with the unit attachment portion. The tag reader is configured to perform a read process of reading developer information concerning the developer from a passive-type electronic tag attached to the replenishment unit, by the short-distance wireless communication via the antenna, in a state where the replenishment unit is attached to the unit attachment portion. The blocking member is configured to block radio waves of the short-distance wireless communication. The displacement mechanism is configured to displace the blocking member in response to an attachment or a detachment of the replenishment unit to or from the unit attachment portion. The displacement mechanism holds the blocking member at a first position in a state where the replenishment unit is not attached to the unit attachment portion, and holds the blocking member at a second position in the state where the replenishment unit is attached to the unit attachment portion, the first position being within a communication range of the short-distance wireless communication and facing the antenna, the second position being positioned away from the antenna and out of the communication range of the short-distance wireless communication. The tag reader includes a processor, a transmission circuit, and a reception circuit. The transmission circuit is configured to perform a precharge process and a transmission process in accordance with a command from the processor, the transmission circuit outputting a carrier signal to the antenna continuously for a predetermined first time period during the precharge process, and outputting a transmission wave signal to the antenna during the transmission process, the transmission wave signal being formed by applying modulation processing to the carrier signal. The reception circuit is configured to perform a reception process of applying demodulation processing including envelope detection to a reception wave signal that has been input through the antenna, and outputting, to the processor, a detection signal obtained through the demodulation processing. In a case where the read process is to be performed: the processor causes the transmission circuit to perform an intermittent transmission process of intermittently outputting the carrier signal such that each output of the carrier signal continues for a predetermined second time period that is shorter than the first time period; during the intermittent transmission process, each time the carrier signal is output, the processor determines whether or not a level of the detection signal is in a satisfactory state in which the level of the detection signal exceeds a predetermined threshold level; in a first case where the level of the detection signal is determined to be in the satisfactory state during a time period in which the intermittent transmission process is performed, the processor performs a read control to cause the transmission circuit to perform the precharge process and the transmission process and identify the developer information based on the detection signal; in a second case where the level of the detection signal is not determined to be in the satisfactory state during the time period in which the intermittent transmission process is performed, the processor determines that the unit attachment portion is in a unit non-attachment state where the replenishment unit is not attached to the unit attachment portion; in the first case, when the processor succeeds in identifying the developer information by the read control, the processor determines that the unit attachment portion is in a unit attachment state where the replenishment unit is attached to the unit attachment portion; and in the first case, when the processor fails to identify the developer information by the read control, the processor determines that the unit attachment portion is in an exceptional state that is neither the unit attachment state nor the unit non-attachment state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

An image forming apparatus 10 according to the embodiment is configured to execute a print process to form an image on a sheet. The sheet is a sheet-like image formation medium such as a sheet of paper or an envelope.

Figure 1:
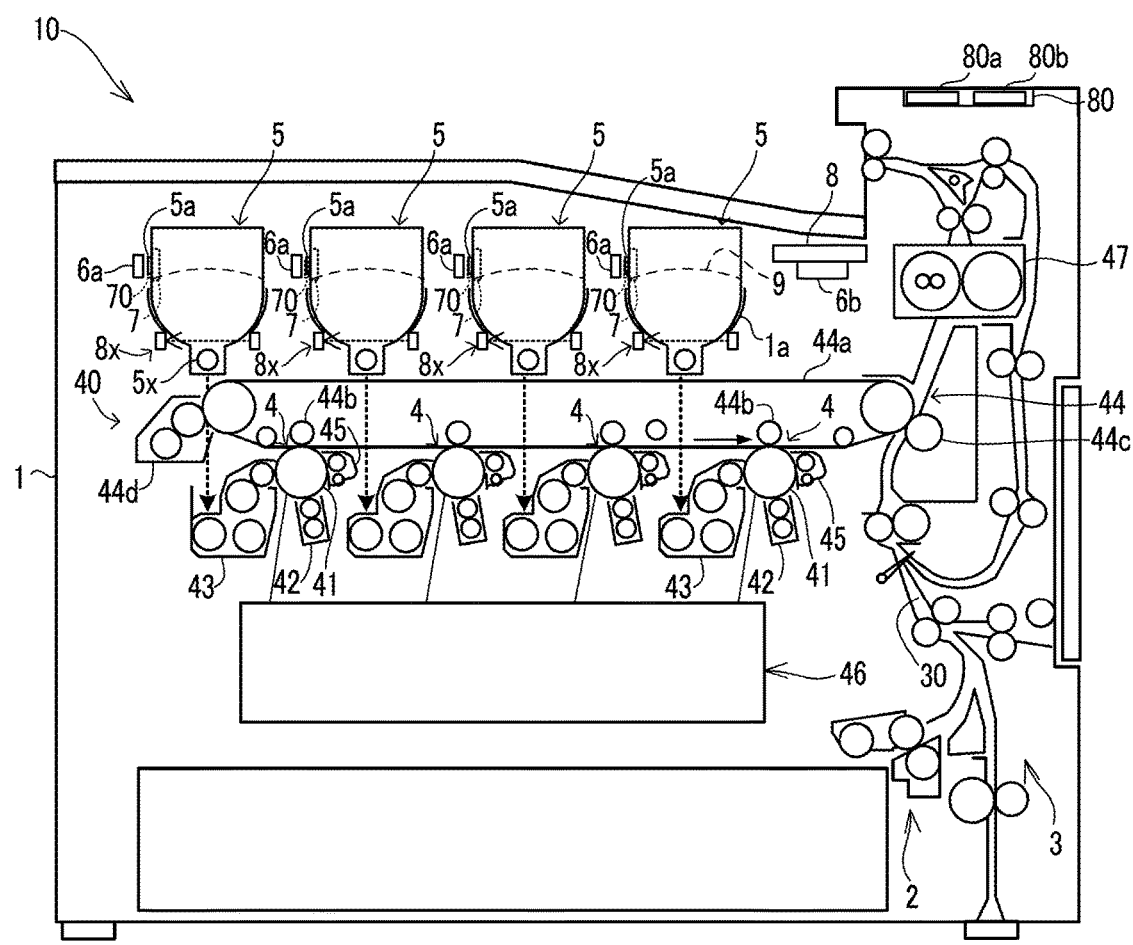
FIG. 1 is a configuration diagram of an image forming apparatus according to an embodiment.

As shown in FIG. 1, the image forming apparatus 10 includes, in a main body 1, a sheet supply mechanism 2, a sheet conveyance mechanism 3, an image forming portion 40, and a control device 8. Furthermore, an operation/display device 80 is attached to an outer surface of the main body 1.

The image forming portion 40 is a device configured to execute the print process by an electrophotographic system. In this case, the image forming portion 40 includes an image creating portion 4, a laser scanning portion 46, a transfer device 44, and a fixing device 47. The image creating portion 4 includes a photoconductor 41, a charging device 42, a developing device 43, and a photoconductor cleaning device 45.

The image forming apparatus 10 shown in FIG. 1 is a color image forming apparatus including the tandem-type image forming portion 40. As a result, the image forming apparatus 10 includes four image creating portions 4 respectively corresponding to colors cyan, magenta, yellow, and black.

Furthermore, the transfer device 44 includes an intermediate transfer belt 44a, four primary transfer devices 44b corresponding to the four image creating portions 4, a secondary transfer device 44c, and a belt cleaning device 44d.

The sheet supply mechanism 2 feeds the sheet to a conveyance path 30. The sheet conveyance mechanism 3 conveys the sheet along the conveyance path 30.

The intermediate transfer belt 44a and the drum-like photoconductors 41 of the image creating portions 4 are rotationally driven by a drive mechanism (not shown). The charging device 42 uniformly charges a surface of the photoconductor 41. The laser scanning portion 46 writes an electrostatic latent image on the surface of the photoconductor 41.

The developing device 43 develops the electrostatic latent image on the surface of the photoconductor 41 by developer 90. This allows an image of the developer 90 to be formed on the surface of the photoconductor 41. It is noted that in the present embodiment, the developer 90 is toner.

The primary transfer devices 44b transfer the images of the developer 90 on the surfaces of the photoconductors 41 to the intermediate transfer belt 44a. This allows a color image to be formed on the intermediate transfer belt 44a from images of the four colors of the developer 90. The photoconductor cleaning devices 45 remove residual developer 90 from the surfaces of the photoconductors 41.

The secondary transfer device 44c transfers the image of the developer 90 from the intermediate transfer belt 44a to the sheet conveyed along the conveyance path 30. The fixing device 47 fixes the image of the developer 90 transferred to the sheet, to the sheet by heating the image. The belt cleaning device 44d removes residual developer 90 from the intermediate transfer belt 44a.

Furthermore, the image forming apparatus 10 includes four replenishment units 5 that respectively store the developer 90 of different colors. The four replenishment units 5 can respectively be attached, in a detachable manner, to four unit attachment portions 1a provided in the main body 1.

The four replenishment units 5 replenish the developer 90 to the four developing devices 43 respectively. Each of the replenishment units 5 includes a replenishment screw 5x which is rotationally driven by a drive mechanism (not shown). As the replenishment screw 5x rotates, the developer 90 is supplied from the replenishment unit 5 to the developing device 43.

The image forming apparatus 10 includes a plurality of remaining amount sensors 8x respectively provided in the plurality of unit attachment portions 1a. Each of the remaining amount sensors 8x is a sensor for detecting an empty state of a replenishment unit 5. The empty state is a state of the replenishment unit 5 where the remaining amount of the developer 90 in the replenishment unit 5 has fallen below a predetermined lower-limit amount.

For example, the remaining amount sensor 8x may be a transmission-type optical sensor configured to detect a level of the developer 90 through a transparent window of the replenishment unit 5. In addition, the remaining amount sensor 8x may be a sensor configured to detect whether or not the weight of the replenishment unit 5 has fallen below a predetermined lower-limit weight.

An electronic tag 5a is attached to each of the replenishment units 5. The electronic tag 5a is a passive-type RF (Radio Frequency) tag.

The image forming apparatus 10 further includes four antennas 6a and one tag reader/writer 6b, wherein the antennas 6a are for the short-distance wireless communication and respectively provided on the four unit attachment portions 1a. For example, the short-distance wireless communication may be a wireless communication that uses a frequency band of 13.56 Mhz.

Figure 2:
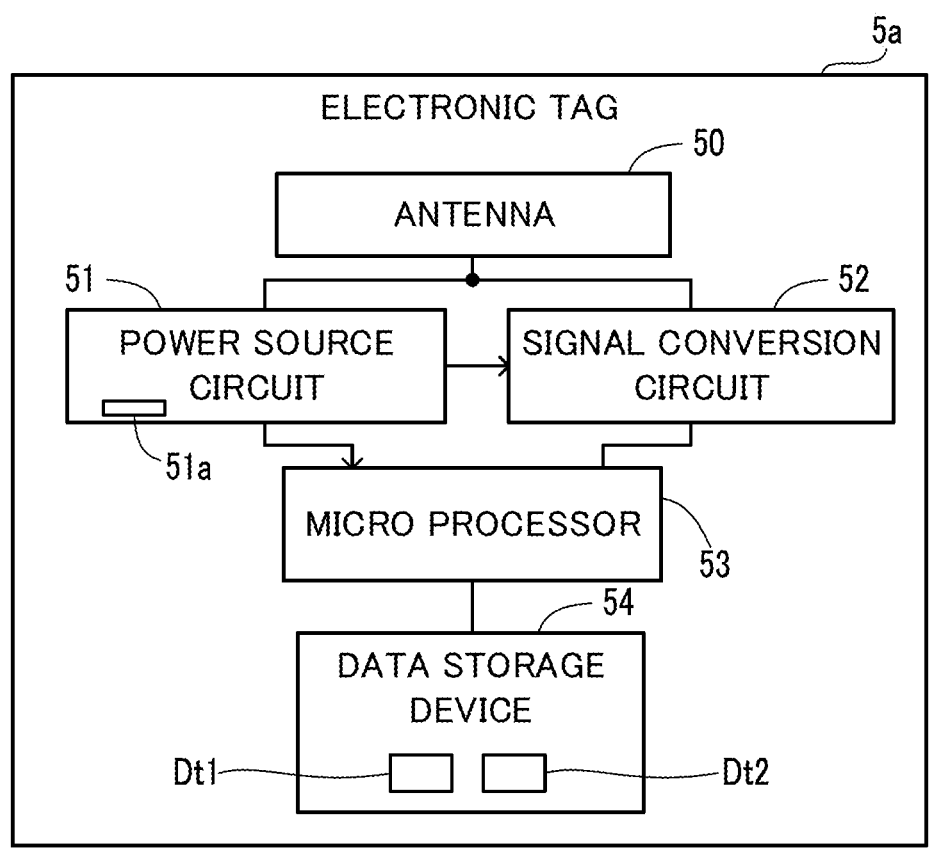
FIG. 2 is a block diagram of an electronic tag attached to a replenishment unit.

As shown in FIG. 2, the electronic tag 5a includes an antenna 50 for the short-distance wireless communication, a power source circuit 51, a signal conversion circuit 52, a microprocessor (processor) 53, and a computer-readable, nonvolatile data storage device 54.

The data storage device 54 is, for example, a flash memory. Developer data Dt1 is stored in advance in the data storage device 54 of the electronic tag 5a, wherein the developer data Dt1 includes information of the developer 90 such as the color and type of the developer 90 stored in the replenishment unit 5. Furthermore, unit identification data Dt2 may be stored in advance in the data storage device 54, wherein the unit identification data Dt2 is unique to each replenishment unit 5. The developer data Dt1 is an example of the developer information.

The power source circuit 51 rectifies a reception signal received by the antenna 50, and applies a DC voltage to the microprocessor 53 and the signal conversion circuit 52. It is noted that the power source circuit 51 includes a secondary battery 51a that is charged by a DC voltage. With the power supplied from the secondary battery 51a, the microprocessor 53 and the signal conversion circuit 52 can transmit a signal to the tag reader/writer 6b.

The signal conversion circuit 52 demodulates the reception signal received by the antenna 50, and transmits the demodulated reception signal to the microprocessor 53. Furthermore, the signal conversion circuit 52 modulates a transmission signal output from the microprocessor 53, and transmits the modulated transmission signal to the antenna 50. The transmission signal is output from the antenna 50 as transmission radio wave.

The microprocessor 53 performs a data communication with the tag reader/writer 6b via the antenna 50 and the signal conversion circuit 52. Specifically, upon receiving a read command from the tag reader/writer 6b, the microprocessor 53 transmits data stored in the data storage device 54 to the tag reader/writer 6b. Furthermore, upon receiving a write command and data from the tag reader/writer 6b, the microprocessor 53 stores the received data in the data storage device 54.

The tag reader/writer 6b is electrically connected with the four antennas 6a. The tag reader/writer 6b is configured to perform a read process in a state where the replenishment unit 5 is attached to the unit attachment portion 1a.

During the read process, data concerning the developer 90, such as the developer data Dt1, is read from the electronic tag 5a attached to the replenishment unit 5 by the short-distance wireless communication via the antenna 6a.

Furthermore, the tag reader/writer 6b is configured to perform a write process to write data to the data storage device 54 of the electronic tag 5a by the short-distance wireless communication. It is noted that the tag reader/writer 6b serves as a tag reader.

Figure 3:
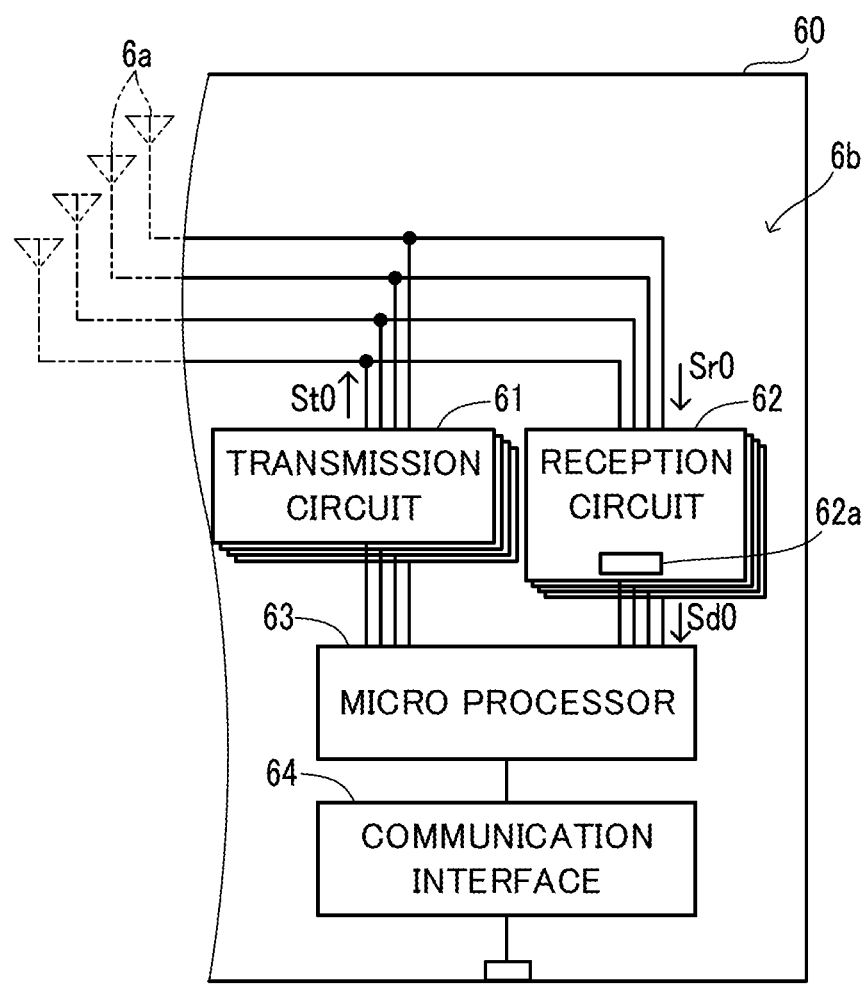
FIG. 3 is a block diagram of a tag reader/writer provided in the image forming apparatus according to the embodiment.

As shown in FIG. 3, the tag reader/writer 6b includes a transmission circuit 61, a reception circuit 62, a microprocessor 63, and a communication interface 64. The transmission circuit 61, the reception circuit 62, the microprocessor 63, and the communication interface 64 are implemented on an electronic substrate 60.

Figure 6:
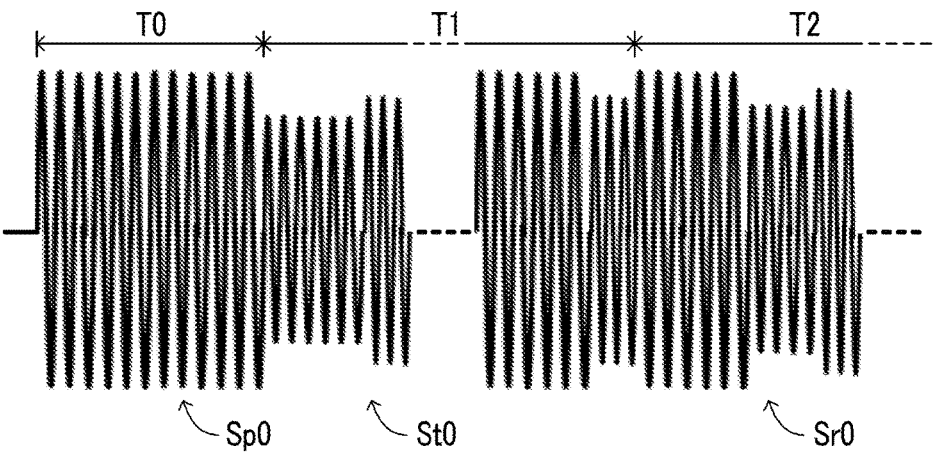
FIG. 6 is a time chart of output signals and input signals output from and input to the tag reader/writer during a precharge process, a transmission process, and a reception process in the image forming apparatus according to the embodiment.

The transmission circuit 61 is configured to perform a precharge process and a transmission process in accordance with a command from the microprocessor 63. As shown in FIG. 6, the transmission circuit 61 outputs a precharge signal Sp0 to the antenna 6a during the precharge process, and outputs a transmission wave signal St0 to the antenna 6a during the transmission process.

The precharge signal Sp0 is a carrier signal that continues for a predetermined charge time period T0. The electronic tag 5a receives a carrier wave that is emitted from the antenna 50 by the output of the precharge signal Sp0. The power source circuit 51 of the electronic tag 5a charges the secondary battery 51a by the energy of the carrier wave. This activates the microprocessor 53 of the electronic tag 5a, and the electronic tag 5a becomes ready to communicate with the tag reader/writer 6b.

It is noted that the charge time period T0 is a time period required for the power source circuit 51 to activate the microprocessor 53 by charging the secondary battery 51a. The charge time period T0 is an example of the first time period.

The transmission wave signal St0 is formed by applying, to the carrier signal, modulation processing corresponding to the transmission data. The transmission data is output from the microprocessor 63 to the transmission circuit 61. In FIG. 6, a part of the transmission wave signal St0 transmitted during a transmission time period T1 is omitted.

For example, during the transmission time period T1, the transmission circuit 61 outputs, to the electronic tag 5a, the transmission wave signal St0 that represents the read command.

Upon receiving the transmission wave signal St0 representing the read command, the electronic tag 5a transmits a signal that represents data stored in the data storage device 54, such as the developer data Dt1 and the unit identification data Dt2.

The reception circuit 62 performs a reception process of applying demodulation processing including envelope detection to a reception wave signal Sr0 that has been input through the antenna 6a, and outputting, to the microprocessor 63, a detection signal Sd0 obtained through the demodulation processing. The reception circuit 62 includes an envelope detection circuit 62a that performs an envelope detection process on the reception wave signal Sr0.

During a reception time period T2 following the transmission time period T1, the reception circuit 62 receives the reception wave signal Sr0 that represents data stored in the data storage device 54. The reception wave signal Sr0 is formed by applying demodulation processing corresponding to the received data to the carrier signal. In FIG. 6, a part of the reception wave signal Sr0 received during the reception time period T2 is omitted.

It is noted that the transmission wave signal St0 sneaks from the transmission circuit 61 into the reception circuit 62. The reception circuit 62 applies the demodulation processing including the envelope detection, also to the transmission wave signal St0 that had sneaked thereto from the transmission circuit 61, and outputs the detection signal Sd0 obtained through the demodulation processing to the microprocessor 63.

As shown in FIG. 6, to read data from the electronic tag 5a, the tag reader/writer 6b outputs the precharge signal Sp0, then outputs the transmission wave signal St0 representing the read command, and receives the reception wave signal Sr0.

In addition, in a case where the reception wave signal Sr0 is not received within a predetermined time period after an output of the transmission wave signal St0 representing the read command, the microprocessor 63 executes a retry process of outputting the transmission wave signal St0 representing the read command, again.

In a case where a normal reception wave signal Sr0 is not received even after the retry process is performed for a predetermined upper limit number of times, the microprocessor 63 determines that a communication with the electronic tag 5a is not available. For example, the upper limit number of times may be in a range from 5 (five) to 10 (ten).

In the example shown in FIG. 3, the tag reader/writer 6b is a multi-antenna-type device including four transmission circuits 61 and four reception circuits 62 corresponding to four antennas 6a.

The operation/display device 80 is a user interface device including an operation device 80a and a display device 80b. The operation device 80a includes, for example, a touch panel or operation buttons for receiving user operations. The display device 80b includes a display panel such as a liquid crystal display panel that can display information.

Figure 4:
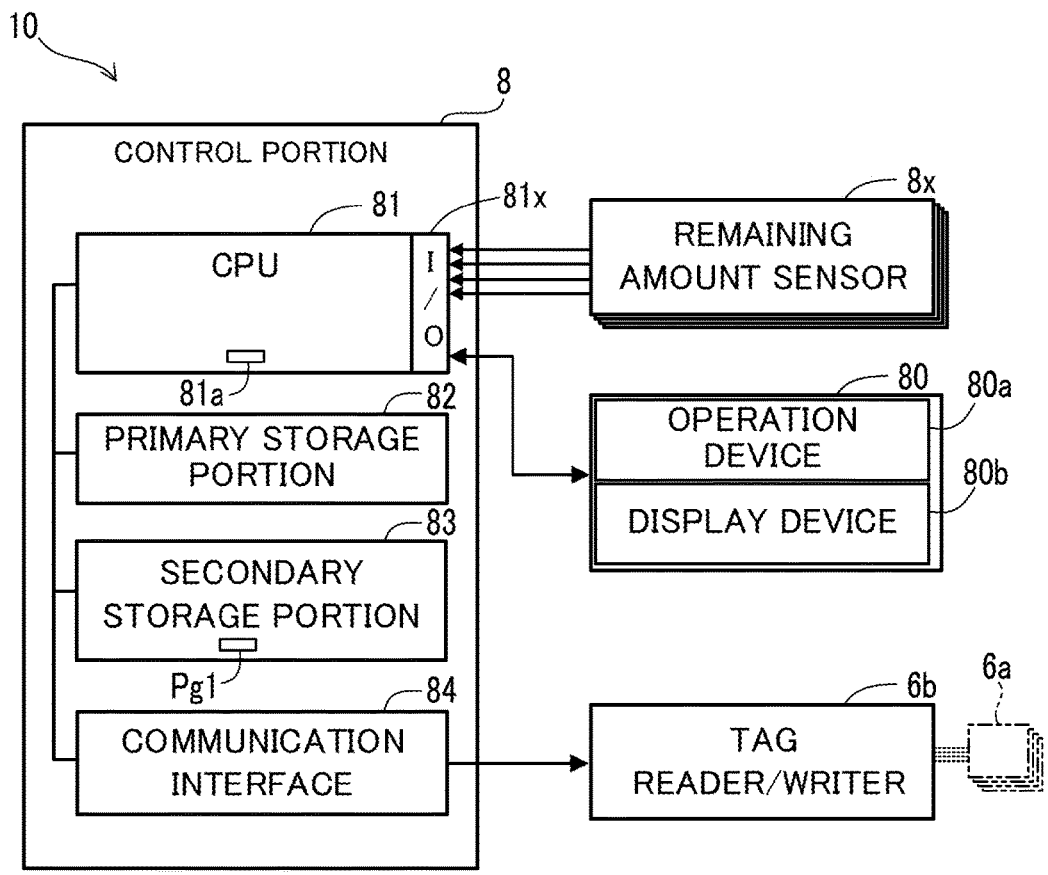
FIG. 4 is a block diagram of control-related portions in the image forming apparatus according to the embodiment.

The control device 8 controls the electric devices included in the image forming apparatus 10. As shown in FIG. 4, the control device 8 includes a CPU (Central Processing Unit) 81, a primary storage device 82 such as a RAM (Random Access Memory), a secondary storage device 83, and a communication interface 84.

The CPU 81 executes various data processes and controls the electric devices by executing programs stored in advance in the secondary storage device 83. The CPU 81 includes a signal input/output port 81x.

The signal input/output port 81x includes a signal input port and a signal output port, wherein the signal input port receives detection signals from various sensors such as the remaining amount sensors 8x, and the signal output port outputs control signals to the electric devices such as a motor (not shown).

The signal input port converts an analog signal into digital data, and stores the converted digital data in the CPU 81. The signal output port converts digital data into an analog signal, and outputs the converted analog signal to an electric device.

For example, when a remaining amount sensor 8x detects the empty state, the CPU 81 prohibits the print process and displays a predetermined empty message on the display device 80b.

The primary storage device 82 primarily stores programs and data that are respectively executed and processed by the CPU 81. The secondary storage device 83 is a computer-readable, nonvolatile storage device. For example, the secondary storage device 83 may be a flash memory.

The communication interface 84 is a communication device configured to perform data communications with external devices such as the tag reader/writer 6b. For example, the communication interface 84 may serve as both a communication device for receiving print job data from an information processing apparatus, and a communication device for performing a communication with the tag reader/writer 6b.

The communication interface 84 transmits the read command output from the CPU 81, to the tag reader/writer 6b, and transfers data received from the tag reader/writer 6b to the CPU 81. Furthermore, the communication interface 84 transmits the write command and data output from the CPU 81 to the tag reader/writer 6b.

The CPU 81 transmits the read command or the write command to the tag reader/writer 6b by specifying an antenna 6a to be used.

It is noted that the control device 8 may be realized by a processor such as a DSP (Digital Signal Processor) or a circuit such as an ASIC (Application Specific Integrated Circuit).

Meanwhile, the image forming apparatus 10 is preferably able to distinguish among the following three states: a unit attachment state where an official replenishment unit 5 is attached to a corresponding unit attachment portion 1a; a unit non-attachment state where no replenishment unit 5 is attached to a unit attachment portion 1a; and an exceptional state where an unofficial replenishment unit is attached to a unit attachment portion 1a. The unofficial replenishment unit is a replenishment unit to which an official electronic tag 5a is not attached.

The image forming apparatus 10 can distinguish among the three states if it includes one or more unit detection sensors that are configured to detect whether or not the replenishment units 5 are attached to the unit attachment portions 1a. In a case where the one or more unit detection sensors are provided in the image forming apparatus 10, the processor, such as the CPU 81, that determines one out of the three states, needs to include as many signal input ports as the number of the unit detection sensors. For example, in the case of the image forming apparatus 10 that can execute a color printing, the processor needs to include four signal input ports so as to determine one out of the three states.

However, the processor is preferably provided with a less number of signal input ports from the viewpoints of reducing the labor for wiring and reducing the cost.

In addition, in a case where information cannot be read normally from the electronic tag 5a even after the retry process is performed for the upper limit number of times, the tag reader/writer 6b determines that a communication with the electronic tag 5a is not available. As a result, with such a configuration where the unit non-attachment state is determined based on disability to communicate with the electronic tag 5a, performing the retry process for a plurality of times delays the determination of the state.

Among the three states, the attachment state and the non-attachment state occur during normal operation of the image forming apparatus 10. As a result, at least the attachment state and the non-attachment state are desired to be determined quickly.

The image forming apparatus 10 includes a blocking member 70 and a displacement mechanism 7 (see FIG. 1, FIG. 5) as described below. With this configuration, the microprocessor 63 of the tag reader/writer 6b can determine one out of the three states without increasing the number of signal input ports in the signal input/output port 81x.

Furthermore, the microprocessor 63 of the tag reader/writer 6b executes an intermittent transmission process as described below, before executing the precharge process. This allows the microprocessor 63 to determine the attachment state and the non-attachment state quickly.

[Blocking Member 70]

The blocking member 70 is configured to block radio waves of the short-distance wireless communication. For example, the blocking member 70 may be made of a metal such as iron.

In the following description, an attachment direction D1 refers to a direction in which a replenishment unit 5 slides toward a corresponding unit attachment portion 1a when the replenishment unit 5 is attached to the unit attachment portions 1a. In addition, an opposite direction to the attachment direction D1 is referred to as a separating direction D2. For example, the attachment direction D1 may be from the front side to the rear side of the image forming apparatus 10.

[Displacement Mechanism 7]

Figure 5:
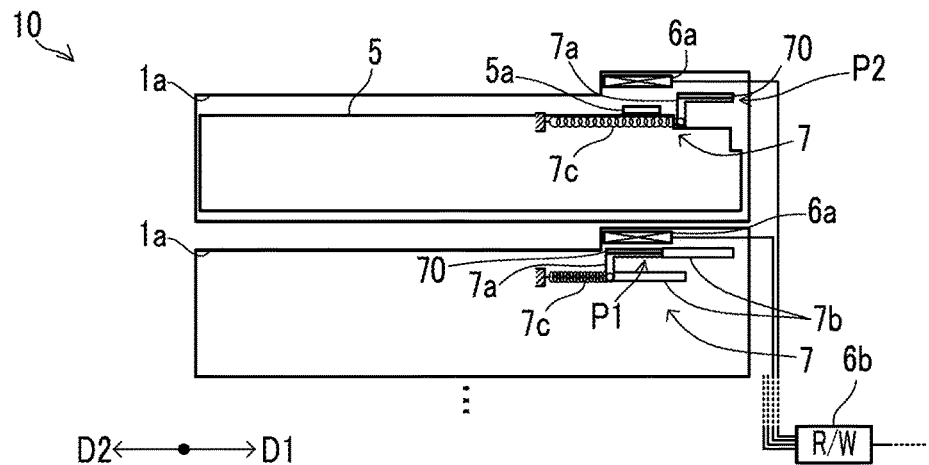
FIG. 5 is a configuration diagram of displacement mechanisms and their periphery in the image forming apparatus according to the embodiment.

As shown in FIG. 5, the displacement mechanism 7 supports the blocking member 70 in a displaceable manner. In the present embodiment, the blocking member 70 is supported by the displacement mechanism 7 so as to be displaced along the attachment direction D1. The displacement mechanism 7 is configured to displace the blocking member 70 in response to an attachment or a detachment of the replenishment unit 5 to or from the unit attachment portion 1a.

The displacement mechanism 7 is provided for each of the unit attachment portions 1a. That is, the image forming apparatus 10 includes four blocking members 70 corresponding to the four unit attachment portions 1a, and four displacement mechanisms 7 corresponding to the four unit attachment portions 1a.

In a state where a replenishment unit 5 is attached to a corresponding unit attachment portion 1a, the electronic tag 5a of the replenishment unit 5 is within a communication range of the short-distance wireless communication, facing the antenna 6a.

In the example shown in FIG. 5, each of the displacement mechanisms 7 includes a displacement portion 7a, a guide portion 7b, and a spring 7c. The displacement portion 7a supports the blocking member 70. The blocking member 70 is fixed to the displacement portion 7a. This allows the blocking member 70 to be displaced together with the displacement portion 7a.

The guide portion 7b is configured to guide the displacement portion 7a along the attachment direction D1. The spring 7c applies an elastic force to the displacement portion 7a in the separating direction D2.

The guide portion 7b restricts the displacement direction of the displacement portion 7a, and restricts at least the displacement range of the displacement portion 7a in the separating direction D2, to a first position P1. In a state where the replenishment unit 5 is detached from the unit attachment portion 1a, the blocking member 70 is held at the first position P1 by the elastic force of the spring 7c and by the guide portion 7b that restricts the displacement of the displacement portion 7a.

When the replenishment unit 5 is attached to the unit attachment portion 1a, a part of the replenishment unit 5 comes into contact with the displacement portion 7a. This allows the blocking member 70 to be displaced in the attachment direction D1 against the elastic force of the spring 7c. In a state where the replenishment unit 5 is attached to the unit attachment portion 1a, the blocking member 70 is held at a second position P2 by the replenishment unit 5 that restricts the elastic force of the spring 7c and the displacement of the displacement portion 7a.

That is, in a state where the replenishment unit 5 is not attached to the unit attachment portion 1a, the displacement mechanism 7 holds the blocking member 70 at the first position P1. Furthermore, in a state where the replenishment unit 5 is attached to the unit attachment portion 1a, the displacement mechanism 7 holds the blocking member 70 at the second position P2.

As shown in FIG. 5, when the blocking member 70 is present at the first position P1, the blocking member 70 is within the communication range of the short-distance wireless communication, facing the antenna 6a. On the other hand, when the blocking member 70 is present at the second position P2, the blocking member 70 is positioned away from the antenna 6a and out of the communication range of the short-distance wireless communication.

[Intermittent Transmission Process]

In a case where the data reading process is to be performed, the microprocessor 63 causes the transmission circuit 61 to execute the intermittent transmission process before the precharge process.

Figure 7:
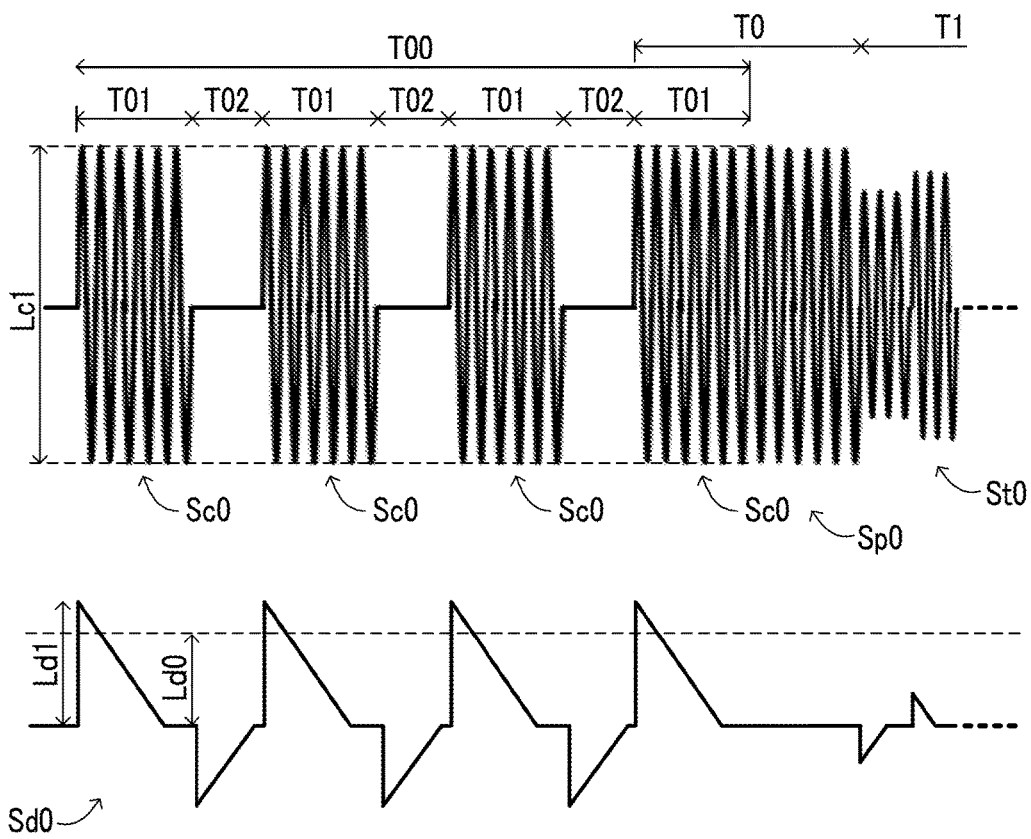
FIG. 7 is a time chart of output signals and detection signals output from and input to the tag reader/writer when the unit attachment portion is in a unit attachment state in the image forming apparatus according to the embodiment.

As shown in FIG. 7, in the intermittent transmission process, a test signal Sc0 is intermittently output, wherein each output of the test signal Sc0 continues for a predetermined test time period T01. The test time period T01 is shorter than the charge time period T0. The test signal Sc0 is a carrier signal that continues for the test time period T01. It is noted that the test time period T01 is an example of a predetermined second time period that is shorter than the charge time period T0.

Furthermore, during the intermittent transmission process, each time the test signal Sc0 is output, the microprocessor 63 determines whether or not a detection signal level Ld1 is in a satisfactory state, wherein the detection signal level Ld1 is the level of the detection signal Sd0, and the detection signal level Ld1 in the satisfactory state exceeds a predetermined threshold level Ld0 (see FIG. 7).

As shown in FIG. 7, when the transmission circuit 61 starts outputting the test signal Sc0 from a state where it stops outputting a signal, the detection signal Sd0 of a level corresponding to the amplitude of the test signal Sc0 is output from the reception circuit 62. The detection signal Sd0 is a signal obtained through the demodulation processing applied to the test signal Sc0 that had sneaked from the transmission circuit 61 into the reception circuit 62.

When the blocking member 70 is present at the second position P2, the test signal Sc0 is output from the antenna 6a as a carrier wave having an amplitude of a predetermined rated level. In this case, the detection signal level Ld1 that is detected in cynchronization with the output of the test signal Sc0, exceeds the threshold level Ld0. In other words, the threshold level Ld0 is set to a level that is slightly smaller than the detection signal level Ld1 of the case where the test signal Sc0 is output from the antenna 6a as a carrier wave having an amplitude of the rated level.

On the other hand, when the blocking member 70 is present at the first position P1, the test signal Sc0 is output from the antenna 6a as a carrier wave having an amplitude smaller than the amplitude of the rated level. This is because the blocking member 70 facing the antenna 6a resists output of radio waves from the antenna 6a.

Figure 8:
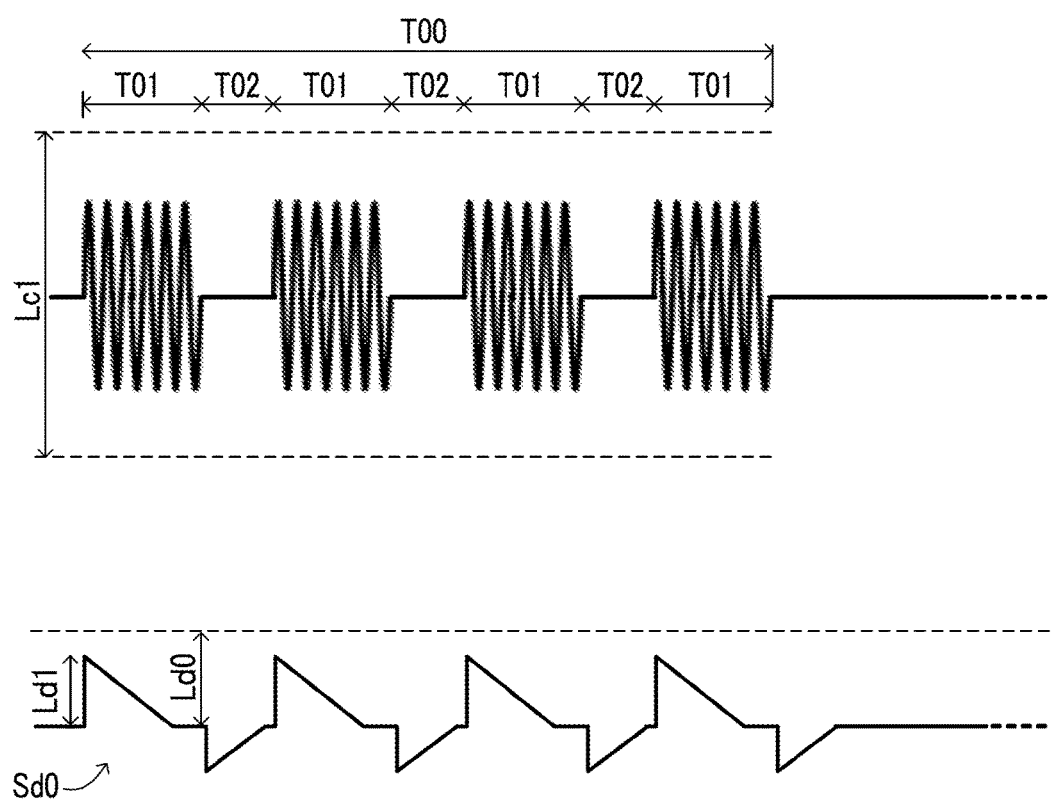
FIG. 8 is a time chart of output signals and detection signals output from and input to the tag reader/writer when the unit attachment portion is in a unit non-attachment state in the image forming apparatus according to the embodiment.

As a result, as shown in FIG. 8, when the blocking member 70 is present at the second position P2, the detection signal level Ld1 that is detected in cynchronization with the output of the test signal Sc0, falls below the threshold level Ld0. In other words, the threshold level Ld0 is set to a level that is larger than the detection signal level Ld1 that is detected in cynchronization with the output of the test signal Sc0 when the blocking member 70 is present at the second position P2.

In the following description, a first case refers to a case where the detection signal level Ld1 is determined to be in the satisfactory state during a time period TOO in which the intermittent transmission process is performed. In addition, a second case refers to a case where the detection signal level Ld1 is not determined to be in the satisfactory state during the time period T00 in which the intermittent transmission process is performed.

FIG. 7 shows an example in which the test signal Sc0 is output four times intermittently with three suspension time periods T02 inbetween. For example, the suspension time period T02 during which the output of the test signal Sc0 is suspended, may be shorter than the test time period T01. This shortens the period TOO during which the intermittent transmission process is performed.

In the first case, the microprocessor 63 performs a read control following the intermittent transmission process. The read control is a process in which the microprocessor 63 causes the transmission circuit to execute the precharge process and the transmission process, and identifies a piece of data that includes the developer data Dt1, based on the detection signal Sd0 corresponding to the reception wave signal Sr0. It is noted that in FIG. 7, the reception wave signal Sr0 is omitted.

As shown in FIG. 7, the test signal Sc0 that is output last in the intermittent transmission process serves as a part of the precharge signal Sp0 output in the precharge process. In the example shown in FIG. 7, the test signal Sc0 of the fourth output serves as a start part of the precharge signal Sp0.

In addition, FIG. 7 shows an example in which the intermittent transmission process is performed such that the test signal Sc0 is output four times, a predetermined number of times, regardless of whether or not the detection signal level Ld1 is determined to be in the satisfactory state.

Figure 9:
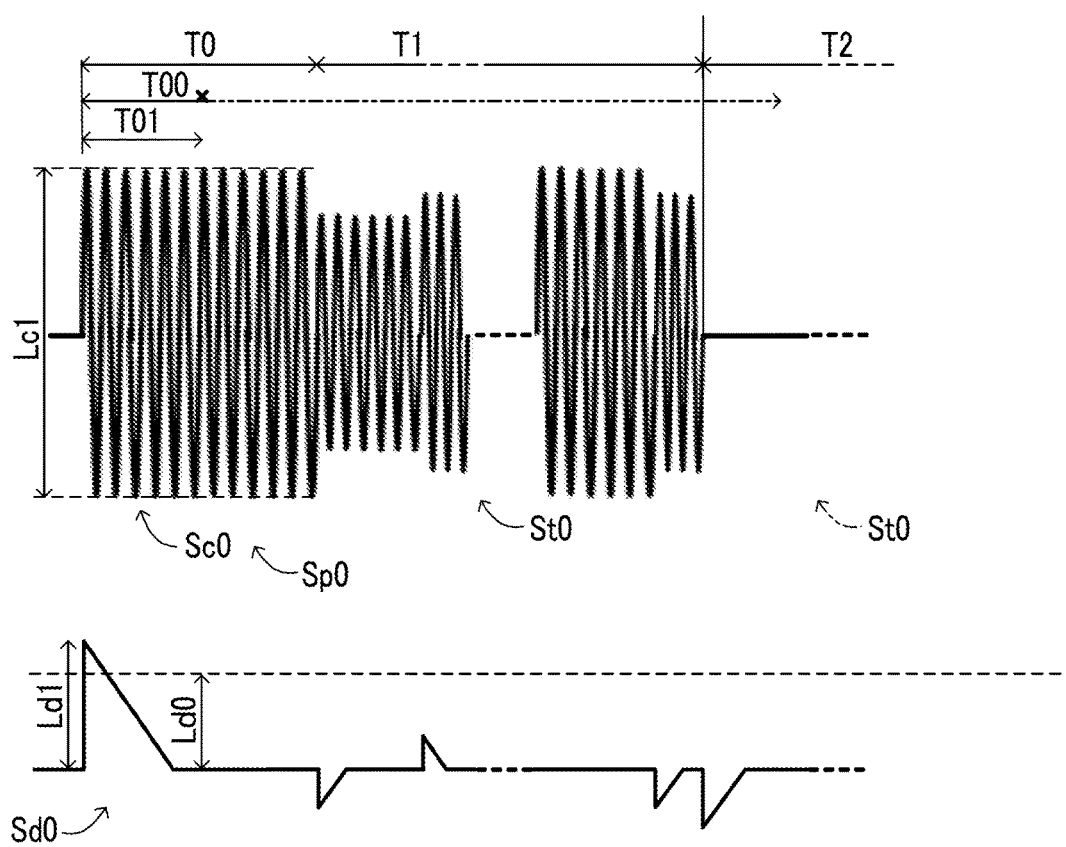
FIG. 9 is a time chart of output signals and detection signals output from and input to the tag reader/writer when the unit attachment portion is in an exceptional state in the image forming apparatus according to the embodiment.

On the other hand, FIG. 9 shows an example in which, in a case where the detection signal level Ld1 is determined to be in the satisfactory state in the middle of the intermittent transmission process performed by the transmission circuit 61, the microprocessor 63 suspends the intermittent transmission process and performs the read control.

In the example shown in FIG. 9, the intermittent transmission process is suspended at a point in time when the detection signal level Ld1 that was detected in response to an output of the first test signal Sc0 in the intermittent transmission process, is determined to be in the satisfactory state.

In the example shown in FIG. 9, the test signal Sc0 of the first output serves as a start part of the precharge signal Sp0 that is output due to the suspension of the intermittent transmission process.

The microprocessor 63 determines that the unit attachment portion 1a is in the unit attachment state when, in the first case, the developer data Dt1 is identified by the read control.

In addition, the microprocessor 63 determines that the unit attachment portion 1a is in the exceptional state when, in the first case, the developer data Dt1 cannot be identified by the read control.

FIG. 9 shows an example in which, in the first case, the reception wave signal Sr0 is not detected by the read control, and the microprocessor 63 cannot identify the developer data Dt1.

For example, the microprocessor 63 determines that the unit attachment portion 1a is in the exceptional state on the condition that, in the first case, the microprocessor 63 cannot identify the developer data Dt1 even after repeating the read control for the upper limit number of times. The upper limit number of times is an example of the predetermined number of times for which the retry is performed.

On the other hand, the microprocessor 63 determines that the unit attachment portion 1a is in the unit attachment state when, in the first case, the developer data Dt1 is identified before the read control is repeated for the upper limit number of times.

On the other hand, in the second case, the microprocessor 63 determines that the unit attachment portion 1a is in the unit non-attachment state. The microprocessor 63 determines one out of the unit attachment state, the unit non-attachment state, and the exceptional state for each of the plurality of unit attachment portions 1a individually.

FIG. 8 shows a case where the intermittent transmission process was performed to output the test signal Sc0 four times intermittently, and all levels of the detection signals Sd0 corresponding to all test signals Sc0 were determined to be not in the satisfactory state. In this case, the microprocessor 63 does not perform the read control.

As described above, the microprocessor 63 can distinguish among: the unit attachment state where an official replenishment unit 5 is attached; the unit non-attachment state where neither an official replenishment unit 5 nor an unofficial replenishment unit is attached; and the exceptional state where an unofficial replenishment unit is attached, without increasing the number of signal input ports required for the distinguishing.

The microprocessor 63 notifies the CPU 81 of the control portion 8 of the determination result of the states of the unit attachment portions 1a, via the communication interface 64.

The CPU 81 functions as a state notifying portion 81a by executing a notification program Pg1 stored in the secondary storage portion 83 in advance (see FIG. 4).

The state notifying portion 81a distinguishes between the unit non-attachment state and the exceptional state and displays the states of the unit attachment portions 1a determined by the microprocessor 63, on the display device 80b.

Figure 10:
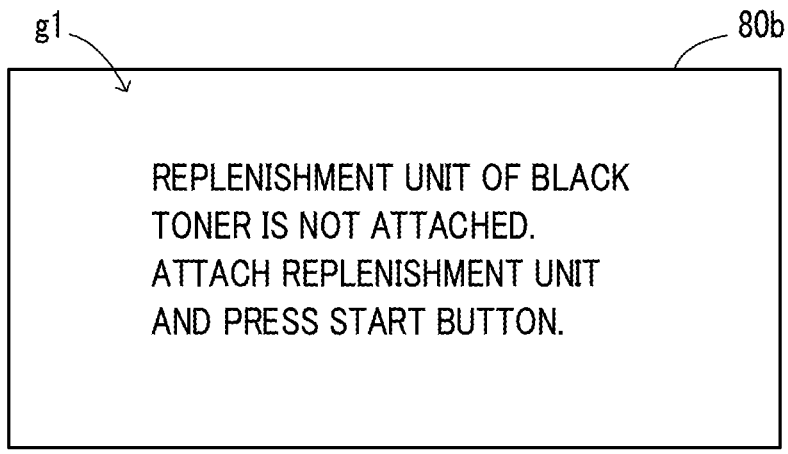
FIG. 10 shows an example of a first notification screen in the image forming apparatus according to the embodiment.
Figure 11:
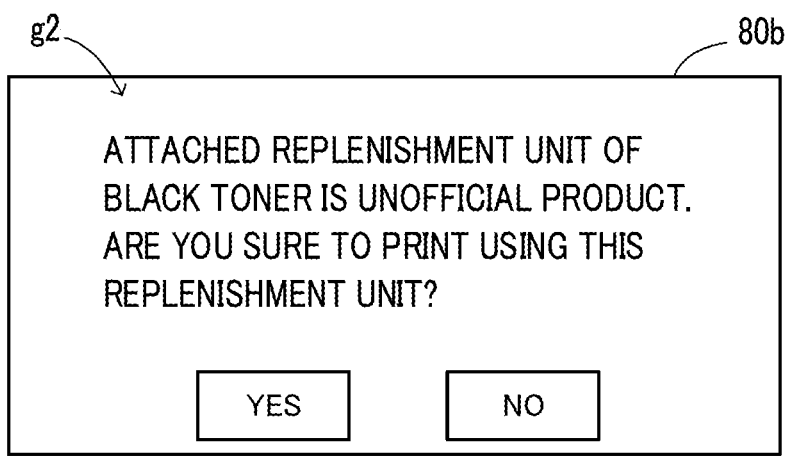
FIG. 11 shows an example of a second notification screen in the image forming apparatus according to the embodiment.

For example, the state notifying portion 81a outputs a first notification g1 via the display device 80b, wherein the first notification g1 urges to attach a replenishment unit 5 to a unit attachment portion 1a that has been determined to be in the unit non-attachment state (see FIG. 10). In addition, when a unit attachment portion 1a has been determined to be in the exceptional state, the state notifying portion 81a outputs a second notification g2 via the display device 80b, wherein the second notification g2 urges to confirm whether or not to permit the print process using the unofficial replenishment unit (see FIG. 11).

It is noted that when all of the unit attachment portions 1a are determined to be in the unit attachment state, the state notifying portion 81a may not output a notification in particular, or may output a notification indicating the normal state.

First Application Example

In the image forming apparatus 10, the displacement mechanism 7 may be a link mechanism that displaces the displacement portion 7a in the attachment direction D1 and the separating direction D2, by being engaged with a part of the replenishment unit 5 that is attached to and detached from the unit attachment portion 1a.

In addition, the blocking member 70 and the displacement mechanism 7 may be applied to a monochrome image forming apparatus that includes only one unit attachment portion 1a.

Second Application Example

In the image forming apparatus 10, the CPU 81 of the control portion 8 may determine the states of the unit attachment portions 1a instead of the microprocessor 63. In this case, the CPU 81 that determines the states of the unit attachment portions 1a, serves as a processor of the tag reader/writer 6b.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
at least one unit attachment portion to which a replenishment unit storing developer can be attached in a detachable manner;
at least one antenna for short-distance wireless communication provided in correspondence with the unit attachment portion;
a tag reader configured to perform a read process of reading developer information concerning the developer from a passive-type electronic tag attached to the replenishment unit, by the short-distance wireless communication via the antenna, in a state where the replenishment unit is attached to the unit attachment portion;
a blocking member configured to block radio waves of the short-distance wireless communication; and
a displacement mechanism configured to displace the blocking member in response to an attachment or a detachment of the replenishment unit to or from the unit attachment portion, hold the blocking member at a first position in a state where the replenishment unit is not attached to the unit attachment portion, and hold the blocking member at a second position in the state where the replenishment unit is attached to the unit attachment portion, the first position being within a communication range of the short-distance wireless communication and facing the antenna, the second position being positioned away from the antenna and out of the communication range of the short-distance wireless communication,
wherein the tag reader includes: a processor;
a transmission circuit configured to perform a precharge process and a transmission process in accordance with a command from the processor, the transmission circuit outputting a carrier signal to the antenna continuously for a charge time period during the precharge process, and outputting a transmission wave signal to the antenna during the transmission process, the transmission wave signal being formed by applying modulation processing to the carrier signal; and
a reception circuit configured to perform a reception process of applying demodulation processing including envelope detection to a reception wave signal that has been input through the antenna, and outputting, to the processor, a detection signal obtained through the demodulation processing, wherein in a case where the read process is to be performed,
the processor causes the transmission circuit to perform an intermittent transmission process of intermittently outputting the carrier signal such that each output of the carrier signal continues for a test time period that is shorter than the charge time period,
during the intermittent transmission process, each time the carrier signal is output, the processor determines whether or not a level of the detection signal is in a satisfactory state in which the level of the detection signal exceeds a predetermined threshold level,
in a first case where the level of the detection signal is determined to be in the satisfactory state during an intermittent transmission time period in which the intermittent transmission process is performed, the processor performs a read control to cause the transmission circuit to perform the precharge process and the transmission process and identify the developer information based on the detection signal,
in a second case where the level of the detection signal is not determined to be in the satisfactory state during the intermittent transmission time period in which the intermittent transmission process is performed, the processor determines that the unit attachment portion is in a unit non-attachment state where the replenishment unit is not attached to the unit attachment portion,
in the first case, when the processor succeeds in identifying the developer information by the read control, the processor determines that the unit attachment portion is in a unit attachment state where the replenishment unit is attached to the unit attachment portion, and
in the first case, when the processor fails to identify the developer information by the read control, the processor determines that the unit attachment portion is in an exceptional state that is neither the unit attachment state nor the unit non-attachment state.

2. The image forming apparatus according to claim 1, wherein
the processor determines that the unit attachment portion is in the exceptional state when, in the first case, the processor cannot identify the developer information even after repeating the read control for a predetermined number of times as retries, and
the processor determines that the unit attachment portion is in the unit attachment state when, in the first case, the processor can identify the developer information before repeating the read control for the predetermined number of times as retries.

3. The image forming apparatus according to claim 1, wherein in a case where the level of the detection signal is determined to be in the satisfactory state in a middle of the intermittent transmission process performed by the transmission circuit, the processor suspends the intermittent transmission process and performs the read control.

4. The image forming apparatus according to claim 1, wherein in the intermittent transmission process, a suspension time period during which an output of the carrier signal is suspended, is shorter than the test time period.

5. The image forming apparatus according to claim 1, further comprising:
a display portion configured to display information; and
a state notifying portion configured to, when the unit attachment portion is determined to be in the unit non-attachment state or the exceptional state, distinguish between the unit non-attachment state and the exceptional state and displays information regarding a determination result of the state notifying portion on the display portion.

6. The image forming apparatus according to claim 1, further comprising:
a plurality of the unit attachment portions; and
a plurality of the blocking members that respectively correspond to the plurality of the unit attachment portions, wherein
the processor determines one out of the unit attachment state, the unit non-attachment state, and the exceptional state for each of the plurality of the unit attachment portions individually.

* * * * *